(12) United States Patent
Dakshinkar et al.

(10) Patent No.: US 11,336,487 B1
(45) Date of Patent: May 17, 2022

(54) OPTIMIZED HIGH-EFFICIENCY (HE) SOUNDING FOR MULTI-LINK DEVICE NETWORKS

(71) Applicant: HEWLETT PACKARD ENTERPRISE DEVELOPMENT LP, Houston, TX (US)

(72) Inventors: Abhiruchi Dakshinkar, Santa Clara, CA (US); Eldad Perahia, Park City, UT (US); Mohd Shahnawaz Siraj, Santa Clara, CA (US); Gaurav Patwardhan, Santa Clara, CA (US); Sachin Ganu, Santa Clara, CA (US); Nitin A. Changlani, Santa Clara, CA (US)

(73) Assignee: Hewlett Packard Enterprise Development LP, Houston, TX (US)

(*) Notice: Subject to any disclaimer, the term of this patent is extended or adjusted under 35 U.S.C. 154(b) by 0 days.

(21) Appl. No.: 17/245,263

(22) Filed: Apr. 30, 2021

(51) Int. Cl.
| | | |
|---|---|---|
| *H04L 25/02* | (2006.01) | |
| *H04L 5/00* | (2006.01) | |
| *H04B 7/06* | (2006.01) | |
| *H04W 76/15* | (2018.01) | |

(52) U.S. Cl.
CPC ....... *H04L 25/0224* (2013.01); *H04B 7/0617* (2013.01); *H04L 5/0048* (2013.01); *H04W 76/15* (2018.02)

(58) Field of Classification Search
CPC . H04L 25/0224; H04L 5/0048; H04B 7/0617; H04W 76/15

USPC ......................................................... 375/262
See application file for complete search history.

(56) References Cited

U.S. PATENT DOCUMENTS

| | | | |
|---|---|---|---|
| 8,971,303 | B2 | 3/2015 | Lee et al. |
| 9,350,434 | B2 | 5/2016 | Sohn et al. |
| 2018/0054348 | A1* | 2/2018 | Luo ..................... H04B 7/0626 |
| 2020/0274588 | A1 | 8/2020 | Jiang et al. |
| 2020/0336176 | A1 | 10/2020 | Seok et al. |
| 2021/0211871 | A1* | 7/2021 | Chu .................. H04W 12/0431 |

OTHER PUBLICATIONS

Khorov, E., Current Status and Directions of IEEE 802.11be, the Future Wi-Fi 7, (Research Paper), IEEE Access, May 8, 2020, pp. 88664-88688, vol. 8, IEEE.

* cited by examiner

*Primary Examiner* — Fitwi Y Hailegiorgis
(74) *Attorney, Agent, or Firm* — Sheppard Mullin Richter & Hampton LLP

(57) ABSTRACT

A system and method for optimizing a channel sounding procedure of a multi-link device (MLD) is disclosed. The improved channel sounding procedure disclosed herein involves an MLD requesting channel sounding information from a group of receivers on a first channel representing a first physical frequency, but receiving channel sounding information from a subgroup of the receivers on one or more other channels representing different physical frequencies. In this manner, the channel sounding procedure on a specific link of an MLD is optimized by offloading some of the sounding process to a different radio link that is also operational for the MLD as part of the same association context.

20 Claims, 8 Drawing Sheets

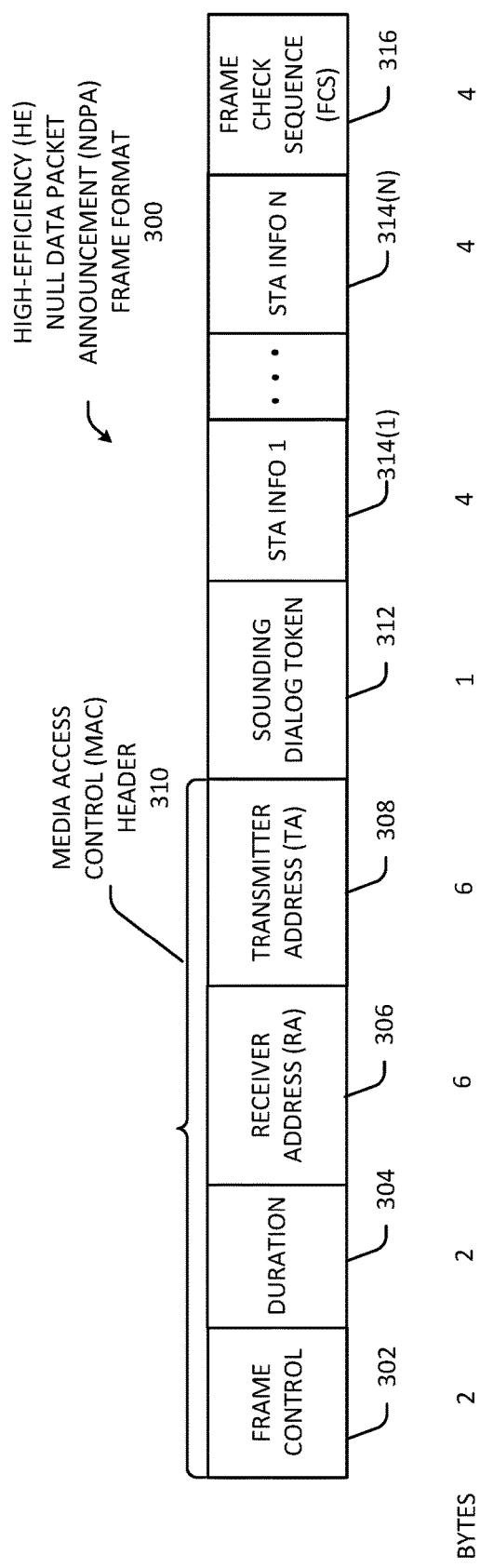
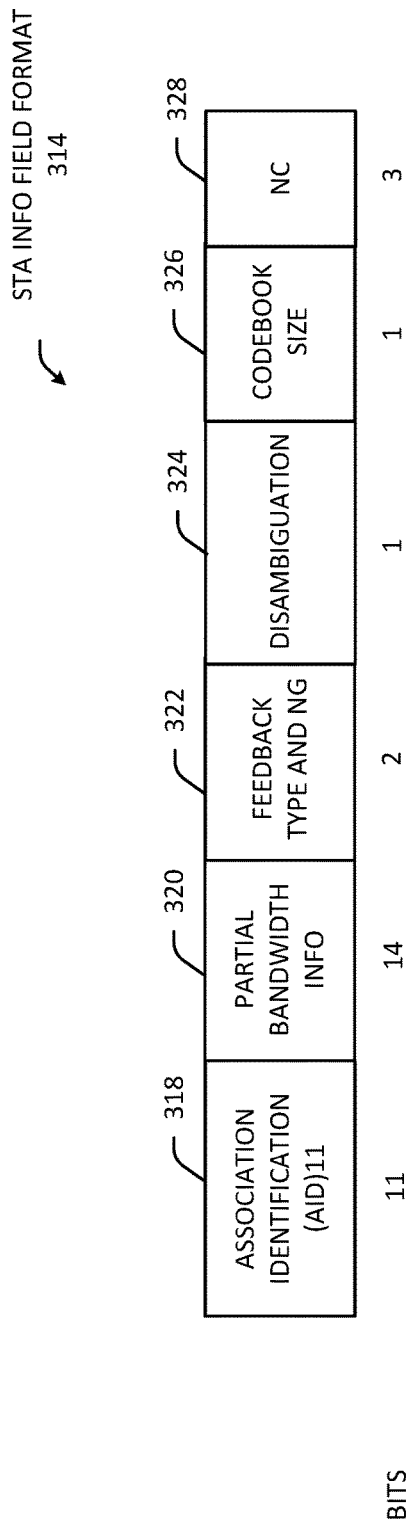
FIG. 3A
FIG. 3B

US 11,336,487 B1

OPTIMIZED HIGH-EFFICIENCY (HE) SOUNDING FOR MULTI-LINK DEVICE NETWORKS

DESCRIPTION OF RELATED ART

The Institute of Electrical and Electronics Engineers (IEEE) 802.11 communication standards—more commonly referred to as Wi-Fi—specify a set of medium access control (MAC) and physical layer (PHY) protocols for implementing wireless local area network (WLAN) computer communication. The 802.11 family of protocols has evolved over time to include new protocols that build upon earlier ones by providing enhanced functionality, improved data rates, lower latency, and the like. 802.11ax—the most recently approved WLAN protocol in the 802.11 family—is considered to be the successor to 802.11ac and is marketed by the Wi-Fi Alliance as Wi-Fi 6. Wi-Fi 6 offers a variety of technical advancements including orthogonal frequency-division multiple access (OFDMA), uplink multi-user, multiple input, multiple output (MU-MIMO), spatial reuse, target wake time, and so forth.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

FIG. 3A depicts an example format for a high-efficiency (HE) null data packet announcement frame transmitted in accordance with an 802.11 channel sounding protocol.

FIG. 3B depicts an example format for a station (STA) Information (Info) subfield of the HE NDPA frame of FIG. 3A.

The figures are not exhaustive and do not limit the present disclosure to the precise form disclosed.

DETAILED DESCRIPTION

The demand for wireless data services continues to grow in both the home and enterprise environments. For example, high data throughput applications such as 4K/8K video steaming, virtual and augmented reality, and the like need wireless technologies that support a greater number of users, provide faster wireless links, and satisfy stringent latency requirements. The IEEE 802.11 working group has begun development of the next generation of Wi-Fi technology, a successor to Wi-Fi 6 known as 802.11be—Extremely High Throughput (EHT). A variety of candidate enhancements aimed at improving data rates and lowering latency are being proposed in 802.11be including 320 MHz bandwidth, 16 spatial streams, multi-link operation (MLO), coordinated OFDMA, and so forth.

To enable MLO, 802.11be introduces the concept of a multi-link device (MLD). An MLD is a device capable of transmitting and receiving data on multiple different communication links/channels, where each link is characterized by a logically independent PHY/MAC component, but higher layers perceive the MLD as a single network entity. Each link is a distinct physical operating frequency across which a radio of an MLD can communicate with a radio of a client device, which itself may be an MLD. MLDs include devices with a single physical radio as well as devices having multiple physical radios. MLDs with a single physical radio can operate on multiple different links (i.e., different physical frequencies) by switching the radio to an appropriate frequency band. MLDs having multiple physical radios, on the other hand, can operate the multiple radios in different bands simultaneously. The terms link, communication link, channel, communication channel, or some other variant thereof may be used interchangeably herein to refer to a distinct physical operating frequency at which data exchange can occur.

Figure 1:
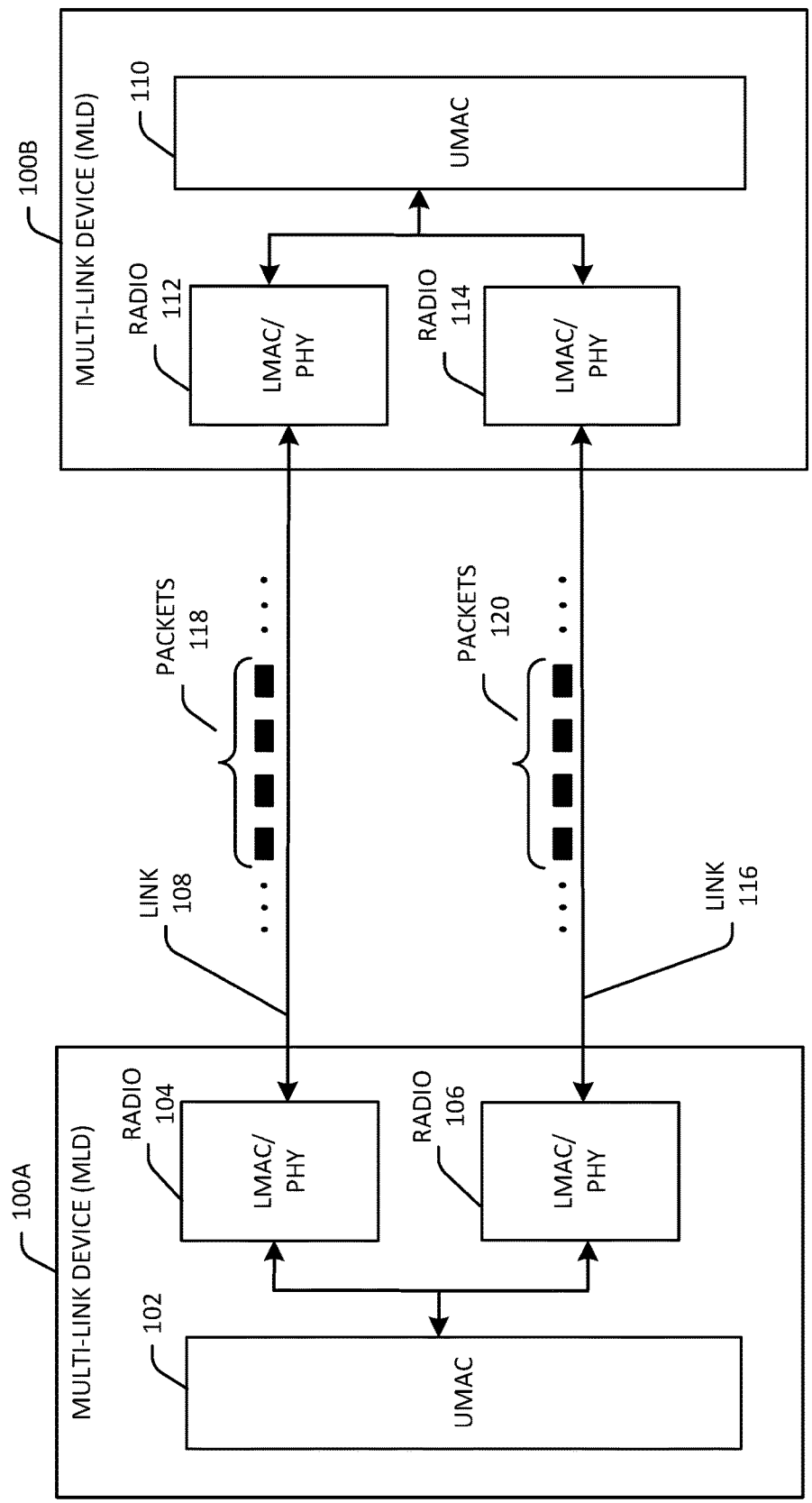
FIG. 1 is a block diagram illustrating multi-link operation of a multi-link device to which embodiments of the disclosed technology are applicable.

FIG. 1 illustrates multi-link operations between two MLDs—a first MLD 100A and a second MLD 100B. MLD 100A may be, for example, an access point and MLD 100B may be, for example, a client device such as laptop computer or a smartphone. While example embodiments of the disclosed technology will be described in the context of MLD 100A being an access point that initiates a channel sounding procedure with respect to an end-user device (MLD 100B), it should be appreciated that this is merely for illustrative purposes, and that each of MLDs 100A, 100B may be any suitable type of network device.

In the example architecture depicted in FIG. 1, MLD 100A includes an upper MAC (UMAC) component 102 communicatively coupled to multiple logically independent lower MAC (LMAC)/PHY components 104, 106. In some embodiments, the logically independent LMAC/PHY components 104, 106 may be different radios (physical or virtual) that are capable of establishing distinct communication links 108, 116 with another network device (e.g., MLD 100B) at different physical operating frequencies. MLD 100B is similarly depicted as including a UMAC component 110 communicatively coupled to multiple LMAC/PHY components 112, 114. As with MLD 100A, the LMAC/PHY components 112, 114 may be different radios with which the radios 104, 106 establish the communication links/channels 108, 116, respectively. In particular, radio 104 may exchange data packets 118 with radio 112 on link 108 and radio 106 may exchange data packets 120 with radio 114 on link 116. While device 100B is shown as a multi-link capable device, this need not be the case.

In some embodiments, one or both MLDs 100A, 100B may be a multi-link, multi-radio (MLMR) device that includes multiple physical radios, in which case, radios 104, 106 and/or radios 112, 114 may be physical radios capable of simultaneously communicating on the distinct physical operating frequencies constituting the links 108, 116. In other embodiments, such as those in which MLD 100A and/or MLD 100B and has only a single physical radio, radios 104, 106 and/or radios 112, 114 may be virtual instantiations of a single physical radio of the corresponding MLD, such that MLD 100A or MLD 100B, whichever the case may be, alternates between communicating on link 108 and communicating on link 116.

In some embodiments, an access point operating as MLD 100A establishes a single association/security context with MLD 100B. A single block ack agreement, and thus, a sequence space for peer-to-peer traffic identifiers (TIDs) may be shared across the multiple links 108, 116. The MLO architecture provides the flexibility to exchange information with a peer device across multiple radio links, which may be selected for transmission/reception (Tx/Rx) based on channel conditions, network density, or the like. As such, the MLO capabilities of MLDs can improve system throughput and reduce transmission latencies.

In some embodiments, MLD 100A may be an access point that initiates a channel sounding procedure such as that specified in Wi-Fi 6 (802.11ax), whereby a transmitter and a receiver determine characteristics of a communication channel between them such that the transmitter is able to then act as a beamformer and direct transmissions to the receiver (beamformee) in accordance with a spatial transmission pattern that is optimized with respect to the channel characteristics. Generally speaking, beamforming refers to the capability of a device to shape/steer/direct its transmitted frames to one or more receivers. A device with such a capability is called a beamformer, while a receiver of such frames is a beamformee. Beamforming depends on channel calibration procedures, referred to as channel sounding in Wi-Fi 6.

The channel sounding protocol specified in Wi-Fi 6 begins with a transmitter broadcasting a probe signal that is received by a receiver. The receiver calculates feedback information based on various channel measurements and sends the feedback information to the transmitter. The transmitter then uses the feedback information to calculate a steering matrix, which (acting as a beamformer) it applies to transmitted signals to optimize reception at one or more receivers (beamformees). More specifically, the transmitter uses the steering matrix to determine the appropriate weights/phase shifts to apply to its antennas in order to direct/steer transmitted energy to a receiver along a precisely determined spatial path which is designed, for example, to maximize the signal-to-noise (SNR) ratio at the receiver.

Prior to the development of the 802.11n standard—which was the first time beamforming was standardized—nearly all access points on the market used antennas with static radiation patterns, which includes omnidirectional antennas as well as antennas with different fixed radiation patterns. Network designers were able to select antennas with longer range and narrower beam widths, but once the antennas were selected, the coverage area was set. In contrast, beamforming uses antenna arrays to dynamically alter the transmission pattern of an AP, potentially changing the transmission pattern on a per-frame basis. By "steering" the transmission pattern of an antenna array using a steering matrix calculated from channel measurements, beamforming can result in potentially significant gains in signal strength at the receiver, with the best results typically observed for mid-range transmissions.

Figure 2:
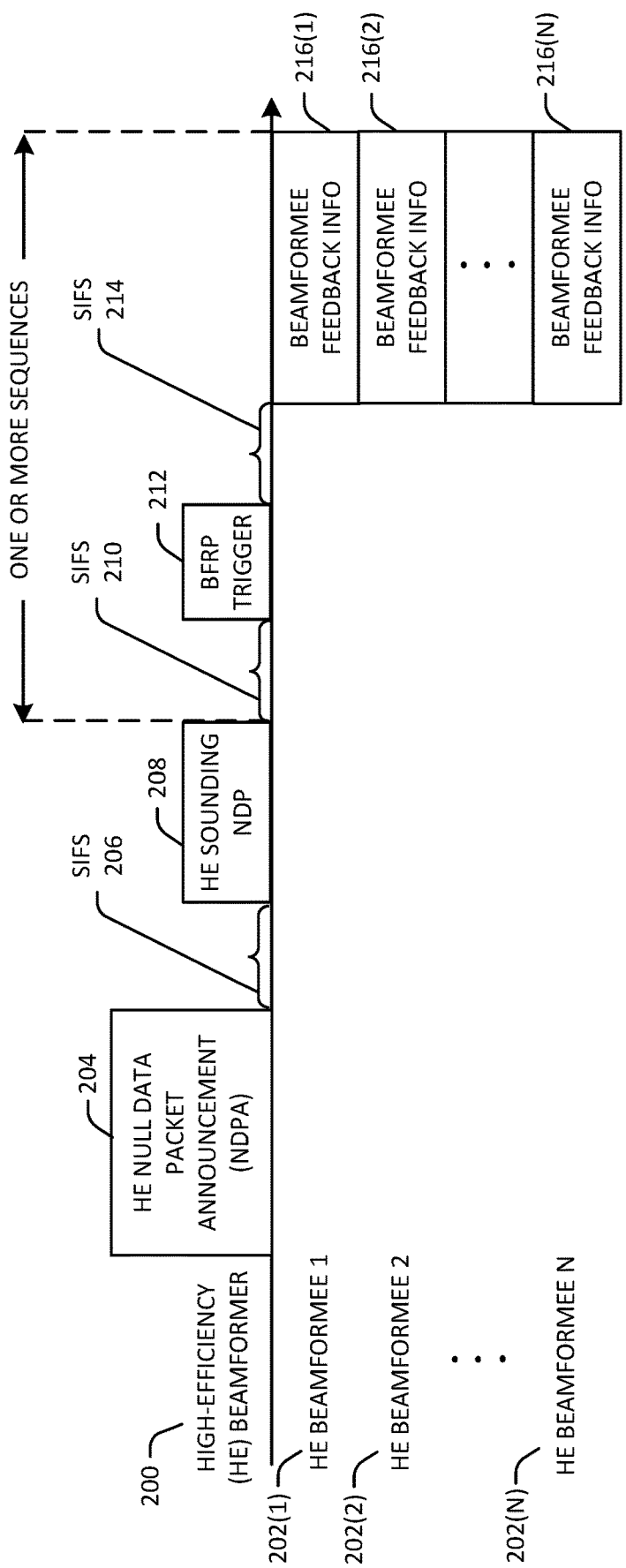
FIG. 2 depicts an example 802.11 channel sounding protocol.

The 802.11n specification describes multiple beamforming methods, but prior to using any of these methods, devices on a link have to agree on a particular beamforming method they will both use on a shared basis. Due to the complexity associated with implementing multiple beamforming methods, many vendors chose not to implement any of the them. To address this problem, 802.11ac (Wi-Fi 6) jettisoned the multiple methods of 802.11n in favor of a particular method of beamforming referred to as a null data packet (NDP) sounding. Wi-Fi 6 does, however, describe two different flavors of NDP sounding that rely on different feedback mechanisms, specifically, high-efficiency (HE) non-trigger-based sounding and HE trigger-based sounding. FIG. 2 schematically illustrates the HE trigger-based sounding procedure described in Wi-Fi 6.

As shown in FIG. 2, an HE beamformer 200 (e.g., an access point) initiates the HE trigger-based sounding procedure by broadcasting a probe signal in the form of an HE NDP announcement (NDPA) frame 204. The HE NDPA frame 204 is used to gain control of the channel and identify beamformees, which are identifiable based on their responses to the announcement frame 204 (not shown in FIG. 2). Stations that are not beamformees defer channel access until the sounding sequence is complete. The HE NDPA frame 204 may include two or more populated STA Info fields that identify intended recipients of the frame 204 and HE sounding NDP 208, and may have the example format shown in FIG. 3A, which will be described in more detail later in this disclosure.

The HE NDPA frame 204 may be followed by a Short Interframe Space (SIFS) 206. A SIFS may refer to a period of time over which a wireless interface processes a received frame (e.g., HE NDP frame 204) and responds with a response frame. Following the SIFS 206, the HE beamformer 200 transmits an HE sounding NDP 208, which is followed by a SIFS 210, and then by a Beamforming Report Poll (BFRP) trigger frame 212. The NDPA frame 204, the sounding NDP 208, and the BFRP trigger frame 212 may constitute a "burst" of frames sent by the beamformer 200.

The burst of frames 204, 208, 212 may be received by multiple beamformees 202(1)-202(N) (generically referred to as beamformee 202), where N≥2. Each beamformee 202 may measure characteristics/parameters of the channel on which the burst of frames 204, 208, 212 is received, using the sounding NDP 208 as a training signal. The sounding NDP 208 is a PHY Layer Convergence Protocol (PLCP) frame with no data field, and as such, no 802.11 MAC frame. Channel sounding can be carried out using training symbols included in a header of the PLCP frame 208. As a result, no MAC data is needed. The sounding NDP 208 may include one High Efficiency Long Training Field (HE-LTF) for each spatial stream used in transmission. More specifically, each beamformee 202 may be configured to analyze OFDM training fields in the sounding NDP 208 to calculate a channel response, which is a transformed estimate of the channel state. As an example, the channel response may be a feedback matrix (referred to by the letter V in the Wi-Fi 6 specification) that each beamformee 202 calculates based on the measured channel characteristics.

To calculate a feedback matrix, a beamformee 202 may first process each OFDM subcarrier in the sounding NDP 208 independently to generate a matrix of values representing the performance of each subcarrier with respect to each pairwise combination of transmitter antenna (antenna of the beamformer 200) and receiver antenna (antenna of the beamformee 202). The contents of the matrix are based on the received power and phase shifts between each pair of antennas. The feedback matrix can be large, in which case, the beamformee 202 may compress the matrix to reduce the transmission time of sending the matrix to the beamformer 200. In particular, a beamformee 202 may transform the feedback matrix using a matrix multiplication operation known as a Givens rotation, which depends on parameters referred to as "angles." Rather than transmitting the full feedback matrix, a beamformee 202 may calculate the angles based on the matrix rotation, assemble them into a compressed feedback form, and return them to the beamformer 200 in a particular order described in the Wi-Fi 6 specification. Three factors that can increase the size of a feedback matrix are: 1) larger bandwidth (e.g., wider channels with more OFDM carriers), 2) more pairwise combinations of transmitter and receiver antennas, and 3) sending two different representations of the angle values to enable devices to use higher resolution when necessary (as permitted in the Wi-Fi 6 specification).

The beamformees 202(1)-202(N) may respectively send the channel feedback information 216(1)-216(N) (generically referred to herein as feedback information 216) to the beamformer 200. Each feedback information 216 may include a compressed feedback matrix calculated by a corresponding beamformee 202. A beamformee 202 may send the compressed feedback matrix that it calculated to the beamformer 200 within an HE compressed beamforming action frame having, for example, the example format depicted in FIG. 3C, which will be described in more detail later in this disclosure.

The beamformees 202(1)-202(N) may send the channel feedback information 216(1)-216(N) as part of respective uplink (UL), MU OFDMA/MIMO transmissions, one or more of which may be sent in response to receipt of the BFRP trigger frame 212. For instance, in example MU beamforming scenarios, the beamformer 200 may initiate a new sequence of SIFS 210, followed by the BFRP trigger frame 212, followed by SIFS 214 to trigger each additional beamformee 202 after the first beamformee 202(1) to send its respective feedback information 216 to the beamformer 200. More specifically, no BFRP poll frame may be needed to trigger the first beamformee identified in the NDPA frame 204 (e.g., beamformee 202(1)) to send its feedback information 216(1). To receive respective feedback information 216(2)-216(N) from the second and subsequent beamformees 202(2)-202(N), however, the beamformer may send a new BFRP trigger frame 212, or more specifically, initiate a new sequence including SIFS 210, BFRP trigger frame 212, and SIFS 214. In this manner, the beamformer 200 ensures that responses are received from all beamformees 202(1)-202(N). While the HE sounding protocol of Wi-Fi 6 is described herein in the context of MU beamforming, it should be appreciated that embodiments of the disclosed technology are also applicable to single-user (SU) beamforming.

Upon receipt of the channel feedback information 216(1)-216(N), the beamformer 200 may calculate a steering matrix based on the received feedback matrices. In particular, each received feedback matrix may indicate to the beamformer 200 how a respective beamformee 202 received the training symbols (e.g., the angles referred to earlier), and thus, how the beamformer 200 should steer future beamformed transmissions to that beamformee. More specifically, in MU beamforming scenarios, the beamformer 200 calculates a master steering matrix for subsequent transmissions to each beamformee 202 by integrating the feedback matrices received from the group of beamformees 202(1)-202(N). Using the calculated steering matrix, the beamformer 200 can then transmit frames to a corresponding beamformee 202 that are biased in a particular direction. Without beamforming, a transmitted signal (i.e., the energy contained therein) is radiated in all directions more or less equally. That is, in the absence of beamforming and assuming an ideal omnidirectional antenna, the signal level is roughly comparable in any direction away from the transmitter. With beamforming, however, the beamformer 200 applies a steering matrix to its transmissions to send them along a preferred path to a corresponding beamformee 202. On the preferred path, the transmissions from the beamformer's 200 antenna array reinforce one another and strengthen the signal, whereas along other paths, the antenna array transmissions interfere with each other and weaken the signal.

While a single data exchange has a fixed initiator and responder, a network station may act as either a beamformer or a beamformee in any given exchange. For instance, referring to FIGS. 1 and 2 together, assume that MLD 100A is an access point and MLD 100B is a client device such as a laptop. The access point 100A (acting as the beamformer 200) applies a steering matrix calculated based on a feedback matrix received from the laptop 100B (acting as a beamformee 202) to send spatially focused frames to the laptop. At the conclusion of the data transmission, the laptop sends an acknowledgement (ack) to the access point, per 802.11 protocol rules. This ack may be beamformed as well, in which case, the laptop is now acting as a beamformer. Thus, in a frame exchange between two devices, either device may choose to calibrate the channel for beamforming purposes. For instance, when client devices have large amounts of data to transmit, the sounding procedure described in Wi-Fi 6 allows them to calibrate the channel to steer transmissions toward their serving access point.

Figure 3C:
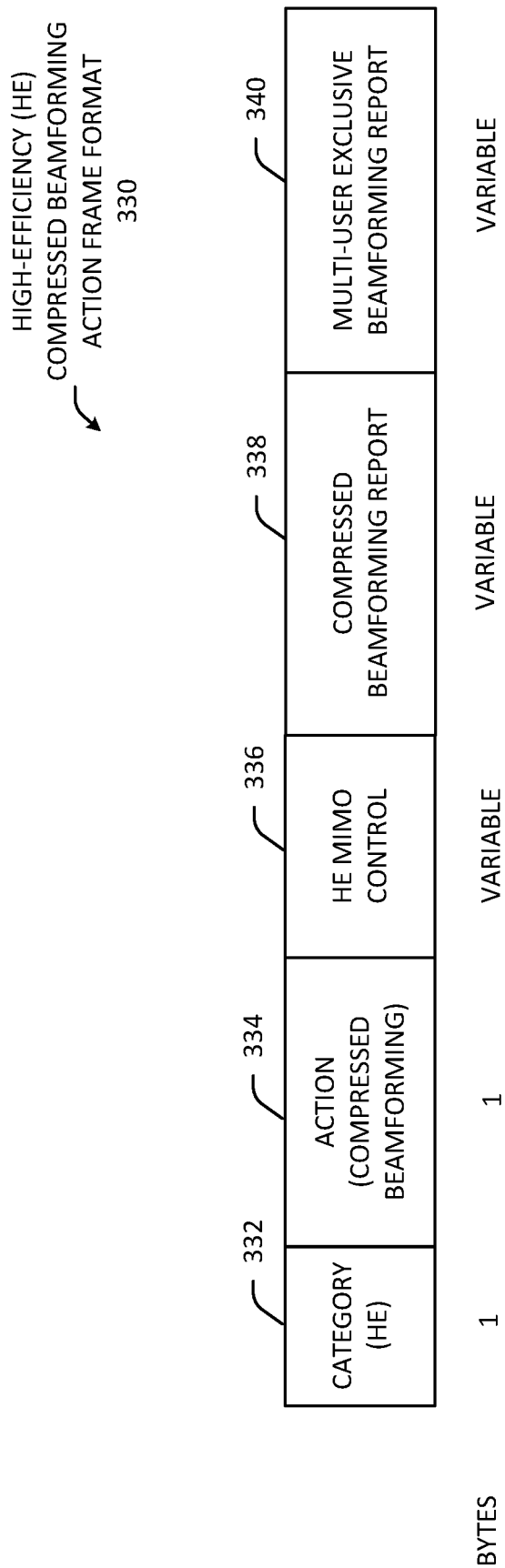
FIG. 3C depicts an example format for a compressed beamforming action frame.

FIG. 3A illustrates an example format for the HE NDPA frame 204. FIG. 3B illustrates an example format of a STA Info field of the NDPA frame 204. FIG. 3C illustrates an example format of a compressed beamforming action frame sent by a beamformee 202 to the beamformer 200, for example. The number of bytes or bits of data associated with each field is shown below the corresponding field in each of FIGS. 3A, 3B, and 3C.

Referring first to FIG. 3A, the example NDPA frame format 300 includes multiple fields including a frame control field 302, a duration field 304, a receiver address (RA) field 306, and a transmitter address (TA) field 308 that together may constitute a MAC header 310. The frame control field 302 may include an identifier of the NDPA frame 204. The duration field 304 indicates a duration of the channel sounding process. The channel sounding procedure may be carried out in one burst (i.e., the burst of frames 204, 208, 212 previously referred to), and as such, the duration field 304 may include a value representing the length of the full exchange of the frames. The RA field 306 identifies a receiver of the NDPA frame 204. In MU beamforming scenarios in which the NDPA frame 204 is sent to multiple receivers, the RA field 306 may be populated with the broadcast address. The NDPA frame format 300 further includes a sounding dialog token field 312, which contains a value selected by the beamformer 200 to identify the NDPA frame 204, as well as a frame check sequence (FCS) value 316.

The NDPA frame format 300 additionally includes various STA Info fields 314(1)-314(N) (generically referred to herein as STA Info field 314), with each STA Info field 314 corresponding to a respective beamformee of the group of beamformees 202(1)-202(N). An example format for a STA Info field 314 is depicted in FIG. 3B. The STA Info field 314 includes an association identifier (AID) subfield 318, a partial bandwidth info subfield 320, a feedback type subfield 322, a disambiguation subfield 324, a codebook size subfield 326, and an NC index subfield 328. The AID subfield 318 includes at least a portion of an AID that was assigned to the corresponding beamformee 202 upon its association with an 802.11 access point (e.g., beamformer 200). In those scenarios in which the AID subfield 318 is not 2047, the AID subfield 318 contains the 11 least significant digits of the AID assigned to the corresponding beamformee 202. When a client device acts as the beamformer 200, the AID subfield 318 is set to 0 because an access point does not have an assigned AID.

The beamformer 200 may initiate the HE trigger-based sounding sequence to solicit various types of feedback from a beamformee 202 such as full bandwidth, SU feedback; full or partial bandwidth MU feedback; and full or partial channel quality indicator (CQI) feedback. To retrieve partial bandwidth feedback from a given beamformee of the group of beamformees 202(1)-202(N), the partial bandwidth info subfield 320 in the STA Info field corresponding to that beamformee may be populated with a resource unit (RU) start index and an RU end index to indicate the portion of the bandwidth for which feedback is solicited from that beamformee.

The example STA Info field format 314 further includes a feedback type subfield 322. The feedback type subfield 322 may be used to specify the type of feedback being requested from the beamformees 202(1)-202(N) such as, for example, full bandwidth SU feedback; full or partial bandwidth MU feedback; or full or partial CQI feedback. In a single-user NDPA frame, this field would be set to 0. The STA Info field format 314 additionally includes an NC index subfield 328, which may indicate the number of columns in the feedback matrix, with one column for each spatial stream. As a 3-bit field, the NC index subfield 328 can take on 8 different values, matching the number of spatial streams supported by Wi-Fi 6. The field 328 may be set to the number of spatial stream minus 1.

Referring now to FIG. 3C, an example HE compressed beamforming action frame format 330 is depicted. In some embodiments, a beamformee 202 may send its calculated compressed feedback matrix to the beamformer 200 within a HE compressed beamforming action frame having the example format 330. The action frame format 330 includes a category field 332, a HE action field 334, a HE MIMO control field 336, a compressed beamforming report field 338, and an MU exclusive beamforming report field 340.

The category field 332 indicates the category to which the action frame belongs, which in this case, is the HE category of data transmissions (indicated in parentheses in FIG. 3C). The HE action field 334 indicates the type of HE action to which the action frame relates, which in this case, is "compressed beamforming" (also indicated in parentheses in FIG. 3C). The HE MIMO control 336 field identifies various attributes of the feedback matrix, which enable the beamformer 200 to interpret the feedback matrix. The HE MIMO control field 336 may be of variable length (e.g., 5, 6, or 7 bytes) depending on which flags and/or bitmaps are set within the field. The compressed beamforming report field 338 includes the calculated feedback matrix. The MU exclusive beamforming report field 340—which is absent from SU beamforming action frames—includes SNR differences between subcarriers. The beamformer 200 uses the information in the field 340 to update the steering matrix when there are multiple recipients. As shown in FIG. 3C, fields 332, 334, and 336 have fixed byte lengths, while each of fields 338 and 340 are variable in length due to the sizes of these fields being dependent on the number of spatial streams as well as the channel bandwidth.

Embodiments of the disclosed technology relate to, among other things, devices, systems, methods, and non-transitory computer-readable media for implementing an optimized channel sounding procedure that improves upon the channel sounding procedure specified in Wi-Fi 6 at least in part by leveraging the capability of an MLD to communicate on multiple physical communication links. In some embodiments, this improved channel sounding procedure involves an MLD requesting channel sounding information from a group of receivers on a first channel representing a first physical frequency, but receiving channel sounding information from a subgroup of group of receivers on one or more other channels representing different physical frequencies. In this manner, the channel sounding procedure on a specific link of an MLD is optimized by offloading some of the sounding process to a different radio link that is also operational for the MLD as part of the same association context. More specifically, in some embodiments, an MLD beamformer sends the training sequence for sounding beamformees on a specific link, retrieves sounding reports from a subset of the beamformees on the same link, and retrieves sounding reports from the remaining peers on a different link that is distinct from but nonetheless part of the same association context as the initial link. In some embodiments, before an MLD initiates the sounding sequence, it may be made aware of the links that various stations are active on. For example, Wi-Fi 7—which is expected to provide a mechanism for associated stations to convey their link status to an access point—can be leveraged.

Figure 4A:
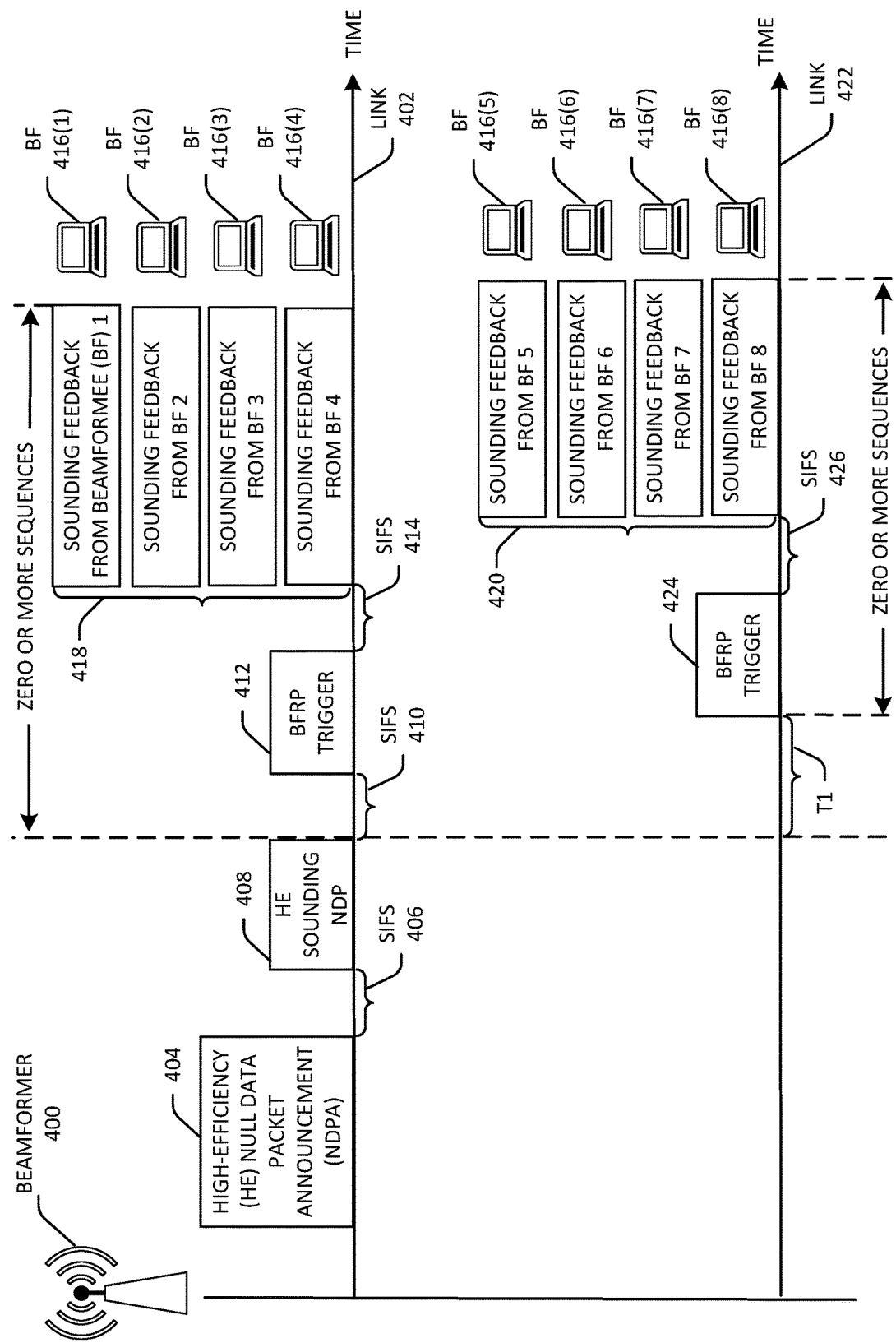
FIG. 4A depicts an improved channel sounding procedure according to embodiments of the disclosed technology.
Figure 4B:
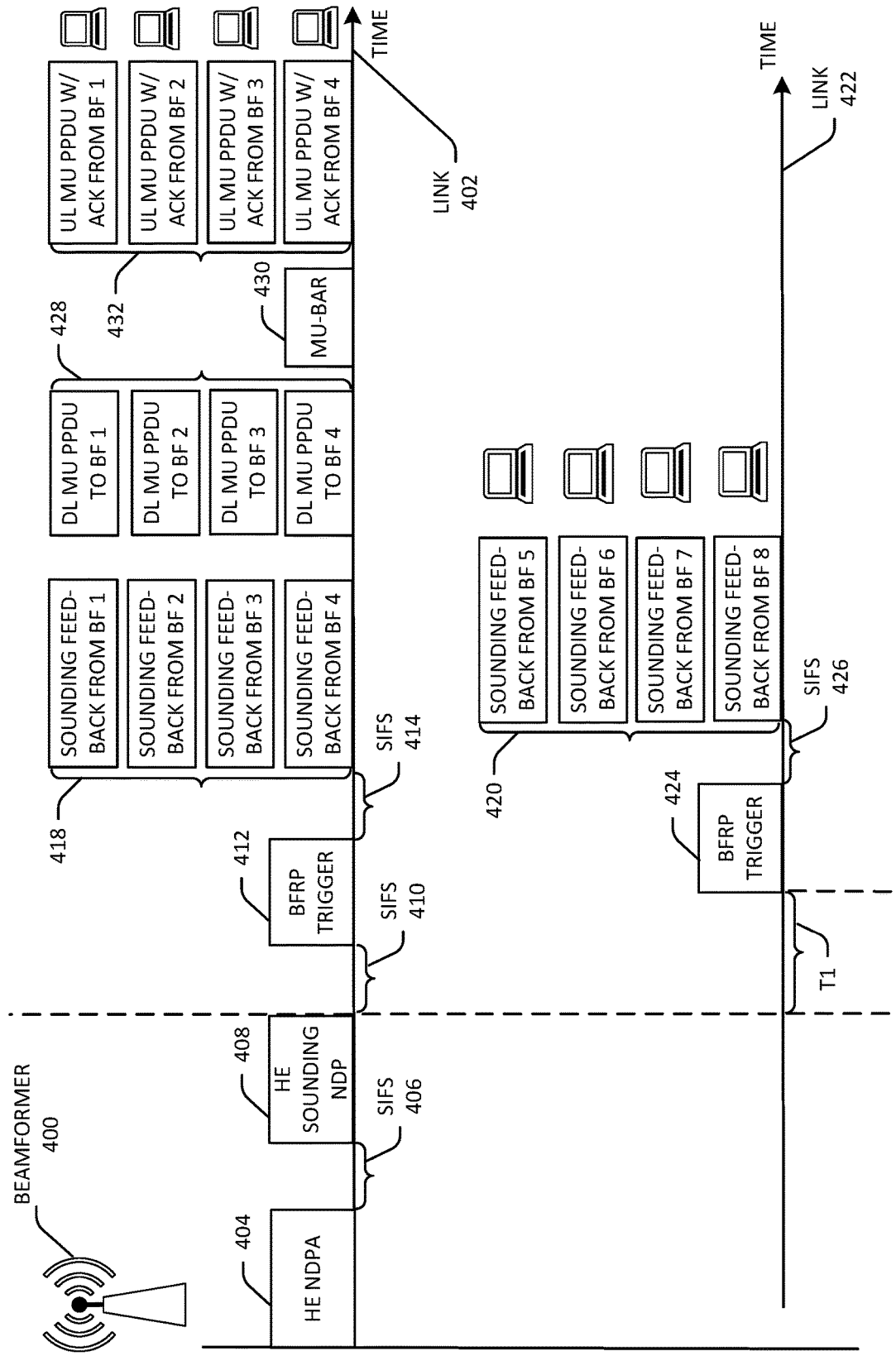
FIG. 4B depicts a variation of the improved channel sounding procedure according to embodiments of the disclosed technology.
Figure 5:
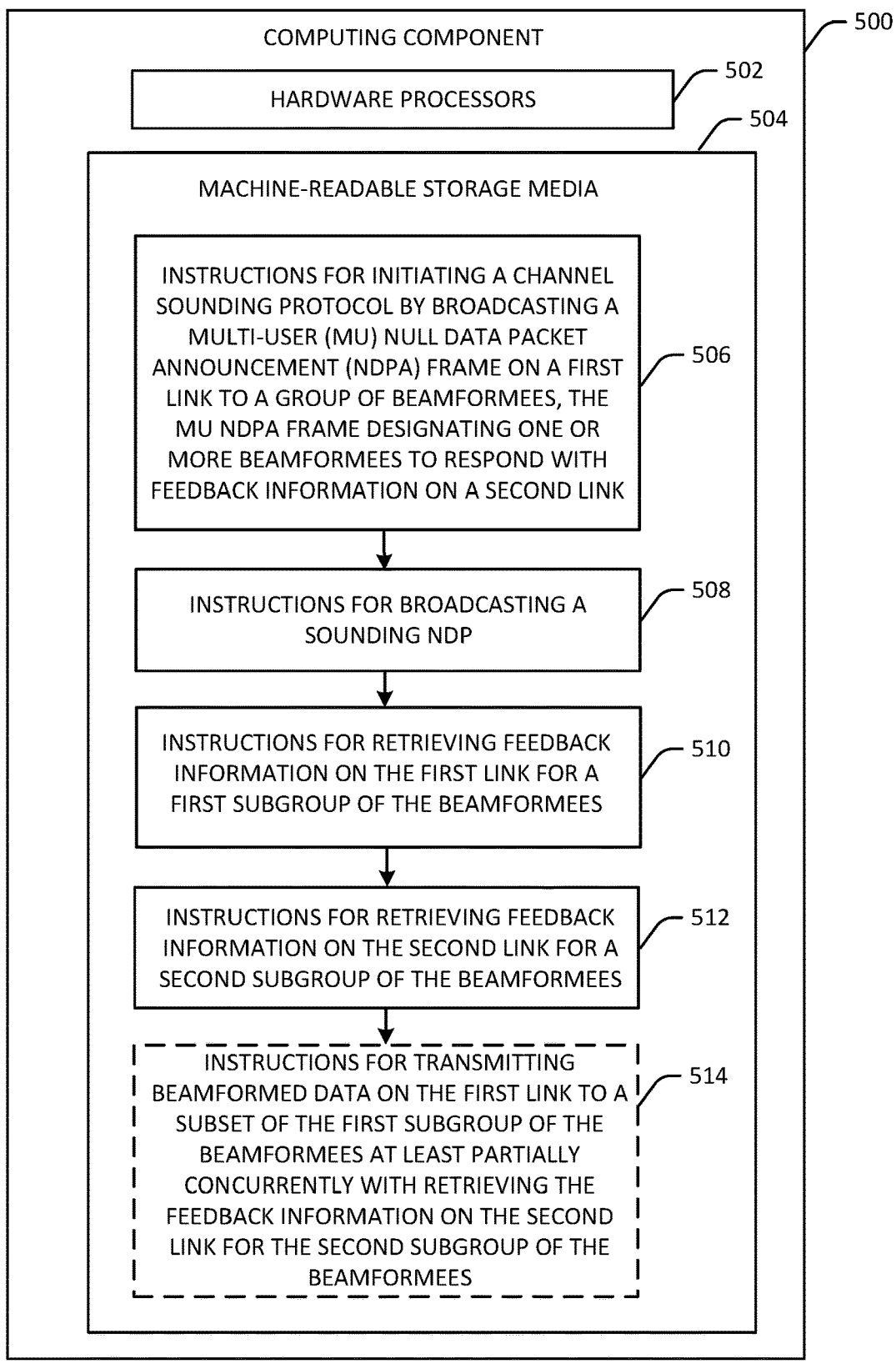
FIG. 5 depicts a set of executable instructions stored in machine-readable storage media that, when executed, cause an illustrative improved channel sounding method to be performed according to embodiments of the disclosed technology.

FIG. 4A depicts an improved channel sounding procedure according to embodiments of the disclosed technology. FIG. 4B depicts a variation of the improved channel sounding procedure according to embodiments of the disclosed technology. FIG. 5 depicts a set of executable instructions for implementing an improved channel sounding method according to embodiments of the disclosed technology. FIGS. 4A, 4B, and 5 will be described at times hereinafter in conjunction with one another.

More specifically, FIG. 5 depicts a computing component 500 that includes one or more hardware processors 502 and machine-readable storage media 504 storing a set of machine-readable/machine-executable instructions that, when executed, cause the hardware processors 502 to perform an improved channel sounding method according to example embodiments of the disclosed technology. In example embodiments, the machine-readable storage media 504 depicted in FIG. 5 may include any other suitable machine-readable storage media described herein including any of the memory or data storage depicted in FIG. 6. The instructions depicted in FIG. 5 as being stored on the machine-readable storage media 504 may be organized into one or more modular pieces of machine-executable code/logic. Each such modular piece of code/logic may include a corresponding subset of the machine-readable and machine-executable instructions depicted in FIG. 5, such that when executed by the hardware processors 502, the instructions cause the hardware processors 502 to perform corresponding tasks/processing. In example embodiments, the set of tasks performed responsive to execution of the set of instructions forming part of a particular modular piece of code/logic may be a set of specialized/customized tasks for effectuating a particular type/scope of processing.

Figure 6:
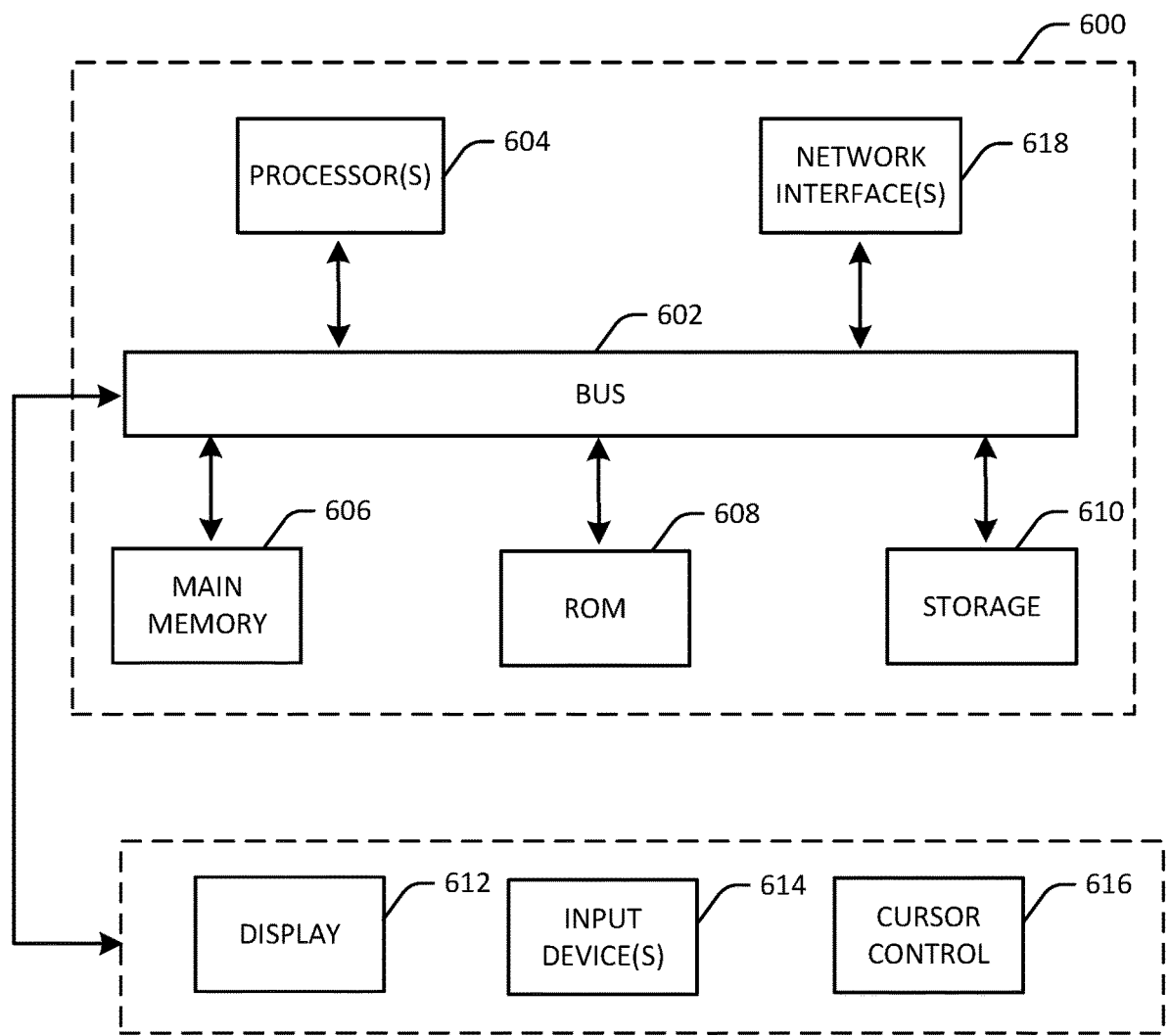
FIG. 6 is an example computing component that may be used to implement various features of embodiments of the disclosed technology.

In example embodiments, the computing component 500 depicted in FIG. 5 may be, for example, the computing system 600 depicted in FIG. 6, or another computing device described herein. In some example embodiments, the computing component 500 may be an access point, a router, a switch, or any other suitable MLD or other beamformer device. A beamformee may include, without limitation, a desktop computer; a laptop computer; a tablet computer/device; a smartphone; a personal digital assistant (PDA); a wearable computing device; or any other suitable client/edge device. In some embodiments, the computing component 500 may be a customized computing device or chip including, without limitation, a field programmable gate array (FPGA), an application specific integrated circuit (ASIC), a programmable logic controller (PLC), a programmable logic array (PLA), or the like.

The hardware processors 502 may include, for example, the processor(s) 604 depicted in FIG. 6. In particular, the hardware processors 502 may include any suitable type of processing unit including, but not limited to, a central processing unit (CPU), a microprocessor, a Reduced Instruction Set Computer (RISC) microprocessor, a Complex Instruction Set Computer (CISC) microprocessor, a microcontroller, a System-on-a-Chip (SoC), a digital signal processor (DSP), an ASIC, an FPGA, a PLC, a PLA, and so forth. In some example embodiments, a single integrated device may constitute the computing component 500, the hardware processors 502, and the machine-readable storage media 504. For example, in some embodiments, the computing component 500 may be an ASIC, FPGA, a SOC, etc. that includes the hardware processors 502 for executing logic that is hardwired into the device and/or instructions stored in the storage media 504.

Referring now to FIG. 5 in conjunction with FIG. 4A, an improved channel sounding procedure according to embodiments of the disclosed technology is initiated at block 506 when the hardware processors 502 execute machine-executable instructions to cause a beamformer 400 to broadcast an MU NDPA frame 404. The beamformer 400 may be an MLD (e.g., MLD 100A) such as, for example, an access point. In some embodiments, the NDPA frame 404 may have the example MU beamforming format 300 illustrated in FIG. 3A. In some embodiments, the beamformer 400 initiates the sounding protocol by broadcasting the NDPA frame 404 on a first link 402. As previously noted, the beamformer 400 may be an MLD capable of Tx/Rx on multiple operational links corresponding to multiple different physical operating frequencies, either via multiple physical radios capable of simultaneously communicating on multiple links or a single physical radio configured to switch between different links. A second operational link 422 of the beamformer 400 is depicted in FIG. 4A. In some embodiments, the operational links 402 and 404 represent different physical operating frequencies. It should be appreciated that two links are shown merely for illustrative purposes and that the beamformer 400 may be an MLD with any number of operational links.

In some embodiments, beamformees 416(1)-416(8) are associated with the beamformer 400. For instance, the beamformer 400 may be an access point and the beamformees 416(1)-416(8) may be client stations that have been associated with the access point. As such, the beamformees 416(1)-416(8) (generically referred to herein as beamformee 416) may each have been assigned a respective AID by the access point. In some embodiments, the NDPA frame 404 includes a respective populated STA Info field corresponding to each beamformee 416. Eight beamformees are illustrated solely as an example. More or less beamformees may be identified in the NDPA frame 404, and thus, may receive the broadcasted frame 404.

As previously noted, in some embodiments, the beamformer 400—intending to sound each of the beamformees 416(1)-416(8) on the first link 402—initiates the channel sounding protocol by broadcasting the NDPA frame 404 to the beamformees 416(1)-416(8) on the first link 402. Referring again to FIG. 5 in conjunction with FIG. 4A, at block 508, the hardware processors 502 execute machine-executable instructions to cause the beamformer 400 to broadcast a sounding NDP 408 after broadcasting the NDPA frame 404. In some embodiments, the beamformer 400 may broadcast the sounding NDP after a SIFS 406 that follows the broadcasting of the NDPA frame 404. The sounding NDP 408 may include OFDM training fields which the beamformees 416(1)-416(8) are configured to analyze to calculate their respective feedback matrices. In some embodiments, the channel sounding sequence may include, at a minimum, the sequence of the NDPA frame 204, the SIFS 406, and the sounding NDP 408.

At block 510, the hardware processors 502 execute machine-executable instructions to cause the beamformer 400 to retrieve feedback information 418 on the first link 402 for a first subgroup of beamformees (e.g., beamformees 416(1)-416(4)). In some embodiments, retrieving the feedback information for beamformees 416(1)-416(4) on the first link 402 includes sending repeated sequences on the first link 402, each of which includes a SIFS 410, followed by a BFRP trigger frame 412, followed by another SIFS 414. In some embodiments, the BFRP trigger frame 412 may not be needed to receive the sounding feedback from a first beamformee 416(1). That is, in some embodiments, a SIFS-separated BFRP trigger frame sequence may be initiated to trigger each additional beamformee other than the first beamformee (e.g., beamformees 416(2)-416(4)) to send its respective sounding feedback to the beamformer 400 on the first link 402. In some embodiments, each BFRP trigger frame 412 may be appropriately programmed to trigger a corresponding beamformee to send its respective sounding feedback (e.g., feedback matrix) to the beamformer 400 on the first link 402.

At block 512, the hardware processors 502 execute machine-executable instructions to cause the beamformer 400 to retrieve feedback information 420 on the second link 422 for a second subgroup of beamformees (e.g., beamformees 416(5)-416(8)). The beamformer 400 may similarly send a BFRP trigger frame 424 on the second link 422 to trigger a corresponding beamformee of the second subgroup to send its respective sounding feedback to the beamformer 400 on the second link 422. As with the BFRP trigger sequences sent on the first link 402, the beamformer 400 may initiate a sequence including a BFRP trigger 424 frame followed by a SIFS 426 to retrieve respective sounding feedback from each beamformee in the second subgroup of beamformees 416(5)-416(8). In contrast to the channel sounding performed on the first link 402, in some embodiments, the beamformer 400 may send a BFRP trigger frame 424 on the second link 422 to also retrieve sounding feedback from a first beamformee (e.g., beamformee 416(5)) in addition to the separate BFRP trigger frame sequences sent on the second link 422 to retrieve the sounding feedback from the other beamformees in the second subgroup.

According to embodiments of the disclosed technology, the beamformer 400 is configured to inform, via the sounding sequence initiated on the first link 402, the second subgroup of beamformees 416(5)-416(8) that they should return their sounding feedback on the second link 422 instead of the first link 402. In some embodiments, the STA Info field in the NDPA frame 404 may be modified from the example frame format 300 to include a subfield for specifying a feedback retrieval link that identifies the link on which the beamformee associated with that STA Info field is to report its sounding information. For instance, the STA Info fields corresponding to beamformees 416(5)-416(8) in the NDPA frame 404 may each include a feedback retrieval link that identifies link 422 as the link on which these beamformees are to report their sounding information. It should be appreciated that despite the fact that the sounding feedback for beamformees 416(5)-416(8) is sent on the second link 422, the sounding feedback still pertains to the channel characteristics of the first link 402. It should further be appreciated that this can be extrapolated to more than two links as well. For instance, a third subgroup of beamformees (not shown in FIG. 4A) may be instructed, via a sounding sequence initiated on the first link 402, to report their sounding feedback on a third link (not shown in FIG. 4A), in which case, that sounding feedback would still pertain to the first link 402.

Embodiments of the disclosed technology can be used to retrieve SU, MU, and/or CQI feedback, for full and/or partial channel bandwidth. The SU feedback may be used for transmit beamforming (TxBF) transmissions to a peer as part of DL OFDMA only transmissions, for example. Similarly, MU feedback could be used for DL OFDMA and MU-MIMO mixed mode transmissions where a single RU is used for MU-MIMO transmission to multiple users.

FIG. 4B depicts a variation on the channel sounding procedure of FIG. 4A according to some embodiments of the disclosed technology. This variation includes the simultaneous transmission of data on the sounded link 402 and reception of sounding feedback on the feedback link 422. More specifically, now referring to FIGS. 5 and 4B in conjunction with one another, at block 514, the hardware processors 502 execute machine-executable instructions to cause the beamformer 400 to transmit beamformed data on the sounded link 402 to the first subgroup of beamformees 416(1)-416(4) at least partially concurrently with retrieving the feedback information 420 from the second subgroup of beamformees 416(5)-416(8) on the feedback link 422. In particular, after performing the sounding on the first link 402, receiving the sounding feedback for the first subgroup of beamformees 416(1)-416(4) on the first link 402, and calculating the steering matrix, the beamformer 400 may initiate, using the calculated steering matrix, beamformed data transmissions to the first subgroup of beamformees 416(1)-416(4), while at the time retrieving the sounding feedback from the second subgroup of beamformees 416 (5)-416(8) on the second link 422. The data transmissions on the first link 402 may include, for example, DL MU PHY layer Protocol Data Units (DL MU PPDUs) to each beamformee in the first subgroup 416(1)-416(4), followed by a MU block ack request (MU-BAR) 430, which in turn, the beamformees 416(1)-416(4) may each respond to with respective UL MU PPDUs 432, each containing a corresponding requested acknowledgement.

As illustrated in both FIGS. 4A and 4B, the beamformer 400 may wait a period of time T1 after sending the sounding NDP 408 on the first link 402 before sending the BFRP trigger frame 424 on the second link 422. In some embodiments, the time T1 accounts for the time needed for the beamformer 400 (e.g., access point) to access the second link 422 as well as the time for the beamformee 416 to calculate its sounding (feedback) matrix. Further, in some embodiments, even if a beamformee 416 is an MLD with multiple physical radios, not all links may be currently active, in which case, the time T1 further accounts for the time needed for a beamformee 416 to activate the feedback retrieval link. A beamformee is expected to activate the feedback retrieval link based on the information contained in the STA Info field that corresponds to that beamformee in the NDPA frame 404. Thus, for a beamformee 416 that is an MLMR client device, the time T1 can be represented as f (channel access time, time to calculate a sounding matrix, time to activate the feedback retrieval link). It should be noted that the beamformer 400 can initiate the channel access process on the second link 422 even prior to initiation of the time T1. Further, the beamformer 400 may factor in the BFRP trigger frame 424 transmission time to at least partially offset the time required for a beamformee to access the second link 422. In some embodiments, if a specific link is sounded (e.g., the first link 402), an MLD client with multiple physical radios can anticipate subsequent traffic on the sounded link and maintain it as an active link.

In some embodiments, a beamformee 416 may be an MLD with only a single physical radio, in which case, the device needs to switch the radio between different operating frequencies to support MLOs. In these embodiments, in order to support sounding offload enhancement, the time period T1 may account for the channel switch time needed for the beamformee 416 to switch from the link being sounded on (e.g., the first link 402) to the feedback retrieval link (e.g., the second link 422). In these single radio embodiments, the channel switch time may substitute for the feedback retrieval link activation time that may be required in the multi-radio embodiments. Thus, for a beamformee 416 that is a multi-link single-radio client device, the time T1 can represented as f (channel access time, time to calculate a sounding matrix, channel switch time). In some embodiments, a single-radio beamformee that is sounded on the first link 402 and instructed to send its sounding feedback relating to the first link 402 on the second link 422 switches back to the first link 402 after sending its feedback on the second link 402. In this manner, the device can receive subsequent beamformed transmissions on the first link 402. However, in some embodiments, the beamformer 400 ensures that the single-radio beamformee is provided enough time to switch back to the sounded link (e.g., the first link 402) before data transfer is initiated to it.

As previously noted, the NDPA frame 404 may include a sounding dialog token field (e.g., field 312 in the NDPA frame format 300). In some embodiments, a single sounding token space may be used across all links of an MLD (e.g., the beamformer 400) to ensure that different sounding sequences initiated by the beamformer 400 do not conflict with one another. Moreover, for a single sounding sequence, a single unique token selected from the shared sounding token space may be used to uniquely identify this sounding sequence. In some embodiments, this can be extended to multiple basic service set identifier (BSSID) modes of operation for the beamformer 400 (e.g., access point). In particular, a given radio of an access point may be associated with multiple virtual access points (VAPs), and a single beacon transmitted by the access point can be used to carry information about all of the VAPs. In some embodiments, a single sounding token space may be shared across all the VAPs of each link that is in use.

In some scenarios, sounding feedback sent by a beamformee 416 may be lost or a link may become inactive during the sounding process. As previously described, a beamformee of the second subgroup 416(5)-416(8) may respond with sounding feedback for the first link 402 on the second link 422. The beamformer 400 may not provide a beamformee 416 with an acknowledgement of receipt of sounding feedback. As such, in some cases, and in particular for single-radio devices, a beamformee 416 may switch back to the sounded link (the first link 402) to await subsequent data transmission and may be unaware that the sounding feedback it sent on the second link 422 was lost. The sounding information may only be reliable for a finite duration of time. As such, in some cases, the beamformer 400 may re-initiate the sounding process for this beamformee 416.

To address these potential obstacles, embodiments of the disclosed technology may specify criteria that determine when the beamformer 400 requests re-transmission of a lost sounding report vs. when the beamformer 400 initiates a new sounding sequence. In some embodiments, as example criteria that may be evaluated, if less than a threshold period of time has elapsed since the beamformer sent the BFRP trigger frame 424 requesting the sounding feedback from a particular beamformee, the beamformer 400 may request re-transmission. On the other hand, if the threshold period of time has elapsed, the beamformer 400 may initiate a new sounding sequence. It should be appreciated that other criteria are contemplated as well. In some embodiments, the criteria may only be evaluated for beamformees that are sounded on one link, but instructed to respond with sounding feedback on a different link. Moreover, in some embodiments, the criteria may further only be evaluated for single radio beamformees.

In some embodiments, a BFRP trigger frame may be enhanced to carry a sounding token and to provide for more flexible retrieval of sounding information. In particular, the HE MIMO control field (e.g., FIG. 3C, field 336) of the HE compressed beamforming action frame in which a beamformee 416 returns sounding feedback to the beamformer 400 includes a sounding dialog token to indicate the corresponding NDPA frame 404. According to example embodiments of the disclosed technology, multiple sounding sequences can be active simultaneously on the same link or different links. As such, in some embodiments, a sounding token may be added to a UserInfo field of a BFRP trigger frame to allow the beamformer 400 (e.g., access point) to control the exact sounding sequence information instance it intends to retrieve. In particular, the sounding reports for different sounding sequences may be procured using the same trigger-based PPDU, with the beamformer 400 using the sounding token in the UserInfo field to identify the NDPA frame and/or sounding NDP with which a particular sounding report is associated.

As previously noted, the 802.11ax standard (Wi-Fi 6) provides a mechanism to retrieve sounding feedback for partial bandwidth by programming a partial bandwidth info subfield in the STA Info field of an NDPA frame (e.g., FIG. 2, NDPA frame 204). Wi-Fi 6, however, does not permit the NDPA frame to include multiple STA Info fields that have the same value in the AID11 subfield (e.g., FIG. 3B, subfield 318). In other words, Wi-Fi 6 does not permit an NDPA frame to specify multiple client devices within a given STA Info field. As such, Wi-Fi 6 does not provide an access point with the flexibility to retrieve multiple sounding reports corresponding to disjoint bandwidth segments using a single sounding token. Some embodiments of the disclosed technology provide a mechanism that offers such flexibility.

In particular, in some embodiments, the UserInfo field of a BFRP trigger frame may be enhanced to carry bandwidth segment information within, for example, a subfield in the UserInfo field. In some embodiments, the beamformer 400 (e.g., access point) is provided with the capability to decide the bandwidth segment over which feedback is requested in a particular BFRP trigger frame. For instance, an access point may transmit an 80 MHz NDP PPDU, but only intend to retrieve the sounding reports for two lower 20 MHz legs in separate transmissions. The access point can achieve this by sending two separate BFRP trigger frames. In each BFRP trigger frame, the UserInfo field would be populated with the same AID value corresponding to the same client device. Further, the bandwidth segment information subfield in the UserInfo field of each BFRP trigger frame may include a different pointer that points to a corresponding one of the 20 MHz legs.

FIG. 6 depicts a block diagram of an example computer system 600 in which various of the embodiments described herein may be implemented. The computer system 600 includes a bus 602 or other communication mechanism for communicating information, one or more hardware processors 604 coupled with bus 602 for processing information. Hardware processor(s) 604 may be, for example, one or more general purpose microprocessors.

The computer system 600 also includes a main memory 606, such as a random access memory (RAM), cache and/or other dynamic storage devices, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions.

The computer system 600 further includes a read only memory (ROM) 608 or other static storage device coupled to bus 602 for storing static information and instructions for processor 604. A storage device 610, such as a magnetic disk, optical disk, or USB thumb drive (Flash drive), etc., is provided and coupled to bus 602 for storing information and instructions.

The computer system 600 may be coupled via bus 602 to a display 612, such as a liquid crystal display (LCD) (or touch screen), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. In some embodiments, the same direction information and command selections as cursor control may be implemented via receiving touches on a touch screen without a cursor.

The computing system 600 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor(s) 604 executing one or more sequences of one or more instructions contained in main memory 606. Such instructions may be read into main memory 606 from another storage medium, such as storage device 610. Execution of the sequences of instructions contained in main memory 606 causes processor(s) 604 to perform the process steps described herein. In alternative embodiments, hard-wired circuitry may be used in place of or in combination with software instructions.

The term "non-transitory media," and similar terms such as machine-readable storage media, as used herein, refers to any media that store data and/or instructions that cause a machine to operate in a specific fashion. Such non-transitory media may comprise non-volatile media and/or volatile media. Non-volatile media includes, for example, optical or magnetic disks, such as storage device 610. Volatile media includes dynamic memory, such as main memory 606. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 602. Transmission media can also take the form of acoustic or light waves, such as those generated during radio-wave and infra-red data communications.

The computer system 600 also includes a communication interface 618 coupled to bus 602. Communication interface 618 provides a two-way data communication coupling to one or more network links that are connected to one or more local networks. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN (or WAN component to communicated with a WAN). Wireless links may also be implemented. In any such implementation, communication interface 618 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 618, which carry the digital data to and from computer system 600, are example forms of transmission media.

The computer system 600 can send messages and receive data, including program code, through the network(s), network link and communication interface 618. In the Internet example, a server might transmit a requested code for an application program through the Internet, the ISP, the local network and the communication interface 618.

The received code may be executed by processor 604 as it is received, and/or stored in storage device 610, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 600.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent. Description of an action, determination, or the like being "based on" some other thing should be construed as being "based at least in part" on the other thing such that one or more additional things may also partially form a basis for the action, determination, or the like.

What is claimed is:

1. A computer-implemented method, comprising:
   sending, by a multi-link device (MLD) on a first channel, a probe signal to each of a first client device and a second client device, the MLD being configured to transmit and receive data on multiple channels including at least the first channel and a second channel, the probe signal specifying that the second client device should return second channel state information on the second channel;
   receiving, by the MLD device, first channel state information from the first client device on the first channel; and
   receiving, by the MLD device, the second channel state information from the second client device on the second channel,
   wherein each of the first channel state information and the second channel state information are indicative of channel characteristics of the first channel.

2. The computer-implemented method of claim 1, wherein the probe signal is a null data packet announcement (NDPA) frame.

3. The computer-implemented method of claim 2, wherein the NDPA frame includes a first station information field identifying the first client device and a second station information field identifying the second client device, and wherein the second station information field includes a feedback retrieval link subfield that identifies the second channel as a feedback retrieval link on which the second client device is to send the second channel state information.

4. The computer-implemented method of claim 3, wherein the first station information field includes the feedback retrieval link subfield, and wherein the feedback retrieval link subfield in the first station information field identifies the first channel as a feedback retrieval link on which the first client device is to send the first channel state information.

5. The computer-implemented method of claim 4, further comprising:
   sending, by the MLD on the first channel, a sounding NDP to each of the first client device and the second client device, the sounding NDP including one or more training fields;
   determining, by the MLD, that a threshold period of time has elapsed since the sounding NDP was sent on the first channel; and
   sending, by the MLD on the second channel and responsive to determining that the threshold period of time has elapsed, a trigger frame to request the second channel state information from the second client device.

6. The computer-implemented method of claim 5, wherein the threshold period of time is determined as a function of: i) a time for the MLD to access the second channel and ii) a time for the second client device to determine the second channel state information.

7. The computer-implemented method of claim 6, wherein the second channel is inactive, and wherein the threshold period of time is further determined as a function of a time for the second client device to activate the second channel.

8. The computer-implemented method of claim 6, wherein the second client device is a single-radio device, and wherein the threshold period of time is further determined as a function of a time for the second client device to switch from the first channel to the second channel.

9. The computer-implemented method of claim 1, wherein the first channel and the second channel share a common sounding token space.

10. The computer-implemented method of claim 1, further comprising:
    sending, by the MLD device to the second client device on the second channel, a first trigger frame to request a first portion of the second channel information corresponding to a first partial bandwidth segment of the first channel; and
    sending, by the MLD device to the second client device on the second channel, a second trigger frame to request a second portion of the second channel information corresponding to a second partial bandwidth segment of the first channel,
    wherein the first trigger frame and the second trigger frame each include an identifier of the second client device and a same sounding dialog token.

11. A multi-link device (MLD) configured to transmit and receive data on multiple channels including at least the first channel and a second channel, the MLD comprising:
    a memory storing machine-executable instructions; and
    a processor configured to access the memory and execute the machine-executable instructions to:
       send, on the first channel, a probe signal to each of a first client device and a second client device, the probe signal specifying that the second client device should return second channel state information on the second channel;
       receive first channel state information from the first client device on the first channel; and
       receive the second channel state information from the second client device on the second channel,
    wherein each of the first channel state information and the second channel state information are indicative of channel characteristics of the first channel.

12. The MLD of claim 11, wherein the probe request is a null data packet (NDP) announcement frame.

13. The MLD of claim 12, wherein the NDPA frame includes a first station information field identifying the first client device and a second station information field identifying the second client device, and wherein the second station information field includes a feedback retrieval link subfield that identifies the second channel as a feedback retrieval link on which the second client device is to send the second channel state information.

14. The MLD of claim 13, wherein the first station information field includes the feedback retrieval link subfield, and wherein the feedback retrieval link subfield in the first station information field identifies the first channel as a feedback retrieval link on which the first client device is to send the first channel state information.

15. The MLD of claim 14, wherein the at least one processor is further configured to execute the machine-executable instructions to:
- send, on the first channel, a sounding NDP to each of the first client device and the second client device, the sounding NDP including one or more training fields;
- determine that a threshold period of time has elapsed since the sounding NDP was sent on the first channel; and
- send, on the second channel and responsive to determining that the threshold period of time has elapsed, a trigger frame to request the second channel state information from the second client device.

16. The MLD of claim 15, wherein the threshold period of time is determined as a function of: i) a time for the MLD to access the second channel and ii) a time for the second client device to determine the second channel state information.

17. The MLD of claim 16, wherein the second channel is inactive, and wherein the threshold period of time is further determined as a function of a time for the second client device to activate the second channel.

18. The MLD of claim 16, wherein the second client device is a single-radio device, and wherein the threshold period of time is further determined as a function of a time for the second client device to switch from the first channel to the second channel.

19. The MLD of claim 11, wherein the at least one processor is further configured to execute the machine-executable instructions to:
- send, to the second client device on the second channel, a first trigger frame to request a first portion of the second channel information corresponding to a first partial bandwidth segment of the first channel; and
- send, to the second client device on the second channel, a second trigger frame to request a second portion of the second channel information corresponding to a second partial bandwidth segment of the first channel,
- wherein the first trigger frame and the second trigger frame each include an identifier of the second client device and a same sounding dialog token.

20. A computer program product comprising a non-transitory computer readable medium storing program instructions that, when executed by a processor, cause operations to be performed comprising:
- sending, by a multi-link device (MLD) on a first channel, a probe signal to each of a first client device and a second client device, the MLD being configured to transmit and receive data on multiple channels including at least the first channel and a second channel, the probe signal specifying that the second client device should return second channel state information on the second channel;
- receiving first channel state information from the first client device on the first channel; and
- receiving the second channel state information from the second client device on the second channel,
- wherein each of the first channel state information and the second channel state information are indicative of channel characteristics of the first channel.

* * * * *